J. R. WAGNER.
WIND SHIELD FOR AUTOMOBILES.
APPLICATION FILED NOV. 17, 1913.
1,273,429.
Patented July 23, 1918.
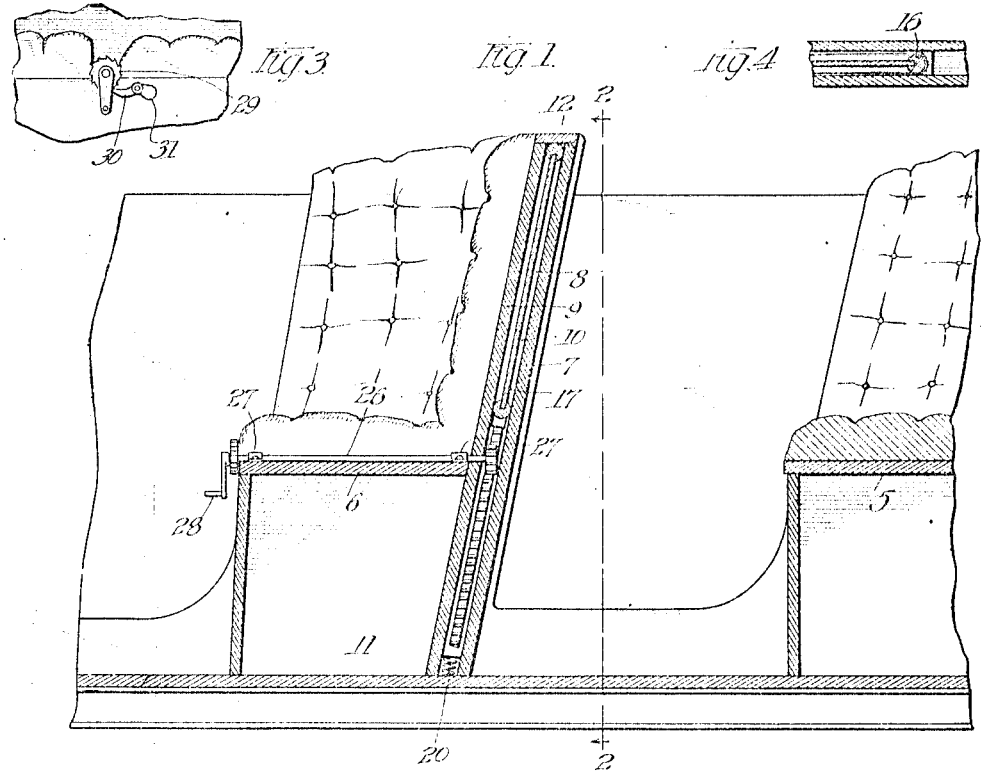
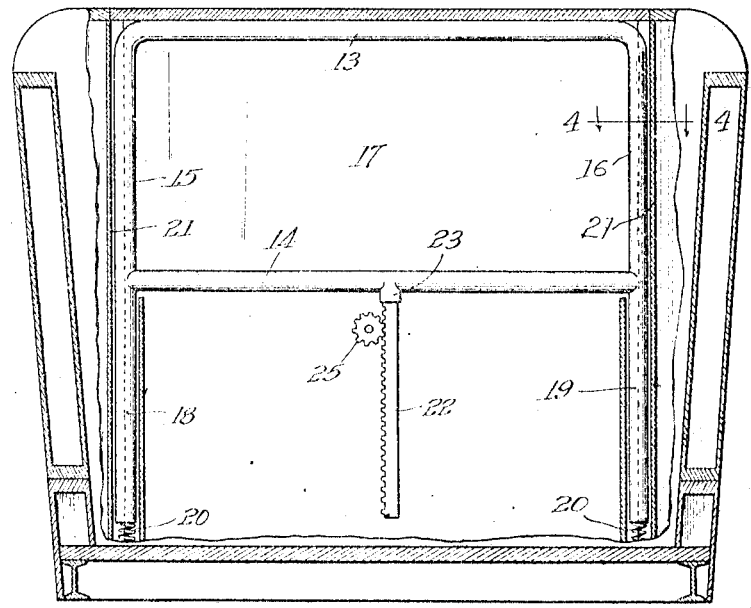
Witnesses
Robert H. Weir
A. W. Carlson
Inventor
Joseph R. Wagner
by Jno. G. Elliott
Atty.

UNITED STATES PATENT OFFICE.

JOSEPH R. WAGNER, OF CHICAGO, ILLINOIS.

WIND-SHIELD FOR AUTOMOBILES.

1,273,429.  Specification of Letters Patent.  Patented July 23, 1918.

Application filed November 17, 1913. Serial No. 801,423.

*To all whom it may concern:*

Be it known that I, JOSEPH R. WAGNER, citizen of the United States, and resident of Chicago, in the county of Cook and State of Illinois, have invented certain new and useful Improvements in Wind-Shields for Automobiles, of which the following is a full, clear, and exact specification.

This invention relates to improvements in wind shields for automobiles, heretofore attached to the front of the machine immediately in front of the chauffeur, and which therefore is of but little protection from wind or dust to those occupying seats rearwardly of the chauffeur.

The object of this invention is a wind shield located at the rear of the chauffeur directly in front of and adjacent to passengers, and which when not in use may be concealed from view, and protected against possible injury.

A further object of this invention is a wind shield which, although, located back of the chauffeur, may be conveniently operated by the chauffeur for moving it both into and out of its operative position.

A still further object of this invention is to utilize the back of the seat for the chauffeur in an automobile as a means for concealing a wind shield for the passengers, and in such a manner that the upholstering of the seat back containing it is not disfigured.

With these ends in view, my invention finds embodiment in certain features of novelty in the construction, combination and arrangement of parts by which the said objects and certain other objects are hereinafter attained, all as fully described with reference to the accompanying drawings, and more particularly pointed out in the claims.

In said drawing:

Figure 1 illustrates in side elevation a portion of an automobile with the front, or chauffeur's seat, and back therefor in vertical section.

Fig. 2 is a vertical section on the line 2—2 of Fig. 1, with the back of the seat-back removed.

Fig. 3 is a detail front elevation of the crank arm ratchet and pawl at the front of the driver's seat, and Fig. 4 is a section on the line 4—4 of Fig. 2 looking in the direction of the arrows.

Similar characters of reference indicate the same parts in the several figures of the drawings.

In the automobile indicated in Fig. 1, 5 is the rear or passenger's seat, and 6 the front or chauffeur's seat, the back of which is indicated at 7, in which two back boards or metal sheets 8 and 9 as may be, form between them a pocket 10, extending from the top to the bottom, and from side to side of the back, and preferably down to the floor 11 of the automobile.

The pocket 10 is closed on all sides except at the top, where it is provided with an opening 12, and which if desired may be provided with a cover, not shown.

Pocket 10 forms a receptacle for a sash consisting of top and bottom bars 13, and 14, and side bars 15 and 16, preferably confining a pane of glass 17, which for strength should be quite thick, as is usual in wind shields.

Integral with the side bars 15 and 16 are legs 18 and 19, the length of each of which together with that of the corresponding side bar of the sash, substantially corresponds with the depth of the pocket 10, the ends of these legs being preferably opposed by coiled springs 20—20, supported by the floor of the machine, and in this connection it may be observed that there may be, if desired, a further number of legs secured to and depending from the sash bar 14.

The sash is confined between the vertical end walls 21—21 of the pocket, the width of which latter relative to the diameter of the sash bars is such that while the sash may be freely moved up and down in the pocket, it is prevented from a lateral and rattling movement.

Secured to and suspended from the bottom sash bar 14 is a rack bar 22, as for example, by means of a clip 23.

Meshing with the rack bar 22 is a pinion 25 on a shaft 26, the bearings of which are in clips 27—27, secured to the seat board 6.

This shaft 26 projects beyond the front edge of the seat, and is provided with a crank arm 28, adjacent which and secured to the shaft is a ratchet wheel 29 engaged by a pawl 30 pivoted to the seat structure, and weighted as indicated at 31.

The advantage of having the elevating and lowering mechanism operated from the front of the seat of the driver is not only one of convenience to the passenger, but prevents disfiguring and any unsightliness of the back of the seat in front of the passenger.

My invention, however, is not limited to the particular arrangement of the operating mechanism, nor to the details of its construction, when obviously other well known means for raising sash may be employed, and besides my invention broadly includes the seat back of any vehicle provided with a receptacle for the purpose of concealing a wind shield whether of glass, or other material, which may be by any means elevated therefrom to an operative position for the performance of its function of shielding passengers seated back of a chauffeur or driver.

In operation the wind shield is normally concealed within the seat back, but whenever the passengers seated rearwardly thereof indicate to the driver that there is an objectionable amount of wind or dust, he can thereupon reach down with one hand, while steering with the other, operate the crank and elevate the shield above the seat back at his rear at whatever height may seem best or desirable, and as readily lower the shield by the same means when its use is no longer required or desired.

Among the advantages in having the operating shaft pass through the driver's seat and the crank arm at the front edge thereof is that both occupy a space unnecessary for other purposes, and in no way interfering with the driver's control of the vehicle, and that his position is such that he may anticipate a dusty portion of the road, or a coming wind before his passengers do, and elevate the wind shield for their protection before the necessity therefor is apparent to his passengers.

In other words my invention provides for the employment of a wind shield so located as to afford the best possible protection as such to passengers, which is out of the way and concealed when not wanted, and under perfect control of the driver when wanted, and this without any disfigurement of the back of the seat making its presence apparent.

Having described my invention, what I claim and desire to secure by Letters Patent is:

1. A device of the character described comprising in combination a wind shield, a front seat, a back therefor provided with a receptacle for containing and concealing said shield, and a mechanical means connected with the shield projecting through the front side of said seat for elevating the shield to its operative position above the seat back, and lowering it therein when not in use.

2. A device of the character described, comprising in combination a wind shield, a seat, a back therefor provided with a receptacle for containing and concealing said shield, a mechanism having a shaft projecting through and adapted to be operated from the front side of the seat for adjustably elevating the shield above the seat back, and lowering it therein when not in use.

3. In a device of the character described, the combination with a seat back provided internally with a receptacle adapted to conceal a wind shield, a wind shield, a rack bar therefor, a pinion for actuating said rack bar, and means in and projecting through the front seat accessible to the driver of the vehicle for actuating said pinion and thereby raising and lowering the wind shield in the seat back.

In witness whereof, I have hereunto set my hand and affixed my seal this 14th day of November, A. D. 1913.

JOSEPH R. WAGNER. [L. S.]

Witnesses:
Jno. G. Elliott,
Mildred Elsner.